(12) United States Patent
Hashizume

(10) Patent No.: US 8,576,466 B2
(45) Date of Patent: Nov. 5, 2013

(54) IMAGE PROCESSING APPARATUS AND IMAGE PROCESSING METHOD THAT CORRECT COLOR CONVERSION TABLE USED WHEN READING DOCUMENT

(75) Inventor: Asako Hashizume, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 12/695,831

(22) Filed: Jan. 28, 2010

(65) Prior Publication Data

US 2010/0208312 A1 Aug. 19, 2010

(30) Foreign Application Priority Data

Feb. 17, 2009 (JP) ................. 2009-034174

(51) Int. Cl.
*G03F 3/08* (2006.01)

(52) U.S. Cl.
USPC ........... 358/518; 358/523; 358/504; 358/505; 358/3.23; 382/162; 382/167

(58) Field of Classification Search
USPC ......... 358/518, 520, 523, 522, 515, 504, 505, 358/512, 1.9, 3.23; 382/162, 167
See application file for complete search history.

(56) References Cited

U.S. PATENT DOCUMENTS

| | | | | |
|---|---|---|---|---|
| 5,315,407 | A * | 5/1994 | Sakamoto et al. | 358/3.07 |
| 6,373,595 | B1 * | 4/2002 | Semba et al. | 358/1.9 |
| 6,650,772 | B1 * | 11/2003 | Inoue et al. | 382/162 |
| 7,656,544 | B2 * | 2/2010 | Nakami et al. | 358/1.13 |
| 2003/0202197 | A1 | 10/2003 | Saito et al. | |
| 2005/0128498 | A1 | 6/2005 | Matsuzaki | |
| 2005/0149864 | A1 * | 7/2005 | Matsuzaki et al. | 715/528 |
| 2006/0203270 | A1 * | 9/2006 | Shirasawa | 358/1.9 |
| 2007/0223016 | A1 * | 9/2007 | Ichitani | 358/1.9 |
| 2008/0130064 | A1 | 6/2008 | Sato | |

FOREIGN PATENT DOCUMENTS

| | | |
|---|---|---|
| JP | 2003-324625 | 11/2003 |
| JP | 2005-012286 | 1/2005 |
| JP | 2005-175806 | 6/2005 |
| JP | 2005-184660 | 7/2005 |
| JP | 2005-244519 | 9/2005 |
| JP | 2006-165864 | 6/2006 |
| JP | 2008-141625 | 6/2008 |

* cited by examiner

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

Conventionally, it is not possible to evenly correct a color conversion table of a reading device in the entire color region even with a limited number of patches. In order to correct a color conversion table, a color conversion table from a device-independent color space into a device-independent color space is newly stored. A shift in read data between devices is reflected in a correction 3D-LUT and a color conversion table is corrected using the correction 3D-LUT. Thereby, it is possible to correct the entire color region with a smaller number of pieces of data and with less time and effort than when a color conversion table is newly recreated.

15 Claims, 14 Drawing Sheets

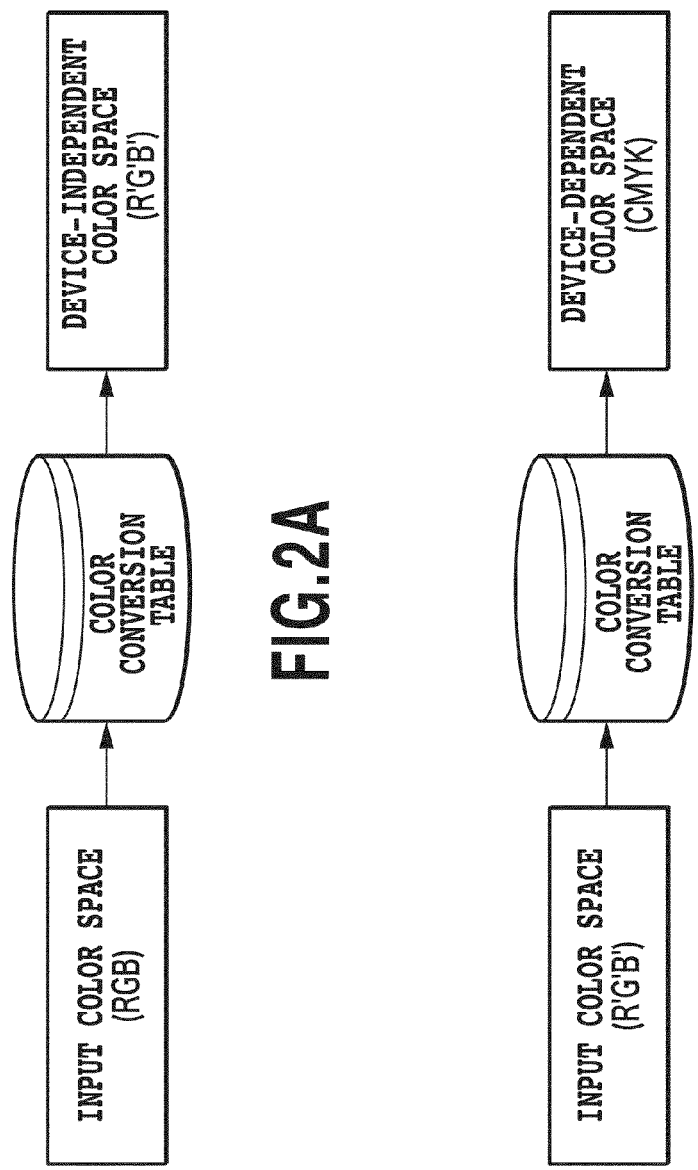

IMAGE PROCESSING APPARATUS AND IMAGE PROCESSING METHOD THAT CORRECT COLOR CONVERSION TABLE USED WHEN READING DOCUMENT

BACKGROUND OF THE INVENTION

1. Field of the Invention

The present invention relates to an image processing apparatus, an image processing method, and an image processing program that correct a color conversion table used when reading a document.

2. Description of the Related Art

In recent years, accompanying the downsizing of devices and the improvement of their functions, as a document feeder (DE) to be mounted on a copying machine, a reader has appeared, which is capable of simultaneously reading double surfaces of a document without the need to reverse the document. That is, a reader for simultaneously reading double surfaces comprising two devices of an obverse surface reading device and a reverse surface reading device has appeared. When the reader for simultaneously reading double surfaces is compared with a reader for reading double surfaces by reversal path comprising a reading device only on one side, the former has an advantage such as reduction in reading time and the reduction in the jam occurrence rate because there is only one path for conveying a document.

On the other hand, it has a disadvantage, such as the occurrence of a shift in the reading characteristics between the obverse surface and the reverse surface because the obverse surface and the reverse surface of a document are read by different sensors. The reading characteristics include, for example, color, modulation transfer function (MTF), and color shift, and here, the color is focused on in particular.

In order to match the color of the obverse surface read by a reader for simultaneously reading double surfaces with that of the reverse surface, there can be conceived a method of recreating the respective color conversion tables with precision or a method of correcting a color conversion table of one reading device with that of the other in accordance with the read value thereof. Here, the former method requires a lot of time and effort or expertise to create a color conversion table, and therefore, the latter method, that is, the method of correcting a color conversion table can be conceived as important because any one can do so with ease.

FIG. 11 is a diagram showing a color conversion table format. The color conversion table in FIG. 11 is a table used to convert an L*a*b* value of input data into an L*a*b* value of output data. Here, the table is a through table by which nothing is converted, however, it is possible to set so that a predetermined input data value is converted into a predetermined output data value. It is also possible to perform color space conversion by converting output data into different color space data, such as CMYK.

Conventionally, as a color correction method of a reading device, a lot of methods have been proposed, which effectively correct a color, while being specialized in a color desired to be corrected. In Japanese Patent Laid-Open No. 2008-141625, a method is proposed, in which a background color of a document is extracted automatically and a correction is made while being specialized in the color. In Japanese Patent Laid-Open No. 2005-244519, a method is proposed, in which only a lattice point around a color desired to be corrected is concentrated on and corrected with precision.

However, when the entire color space is corrected, the method disclosed in Japanese Patent Laid-Open No. 2008-141625, in which a correction is made while being specialized in one color, requires data of a large number of colors. Further, the method disclosed in Japanese Patent Laid-Open No. 2005-244519, in which the lattice points around the focused lattice point are condensed, requires a very large number of lattice points after all. This method requires a lot of data and memory size, processing time, etc. It makes no advantage compared to recreating a color conversion table.

In contrast to the above, a method of correcting the entire color space with a small number of patches without the need to recreate entire color conversion table includes a method disclosed in Japanese Patent Laid-Open No. 2005-175806. A method of correcting a destination profile is proposed, in which color conversion is performed from a device-independent color space into a device-dependent color space using a color conversion lookup table, also called an ICC profile, on a side of printer, which is an output device.

However, when the method proposed as above is applied to a color conversion table of a reading device, there arises a serious problem.

FIG. 2A and FIG. 2B are diagrams showing conversions between color spaces. An input device has a color conversion table used to perform conversion from a device-dependent color space (RGB) into a device-independent color space (R'G'B') as shown in FIG. 2A. On the other hand, an output device has a color conversion table used to perform conversion from a device-independent color space (R'G'B') into a device-dependent color space (CMYK) as shown in FIG. 2B.

FIG. 3A and FIG. 3B show modeled distributions of lattice point data in color spaces on the input side (FIG. 3A) and the output side (FIG. 3B) in a general color conversion table. On the input side, the lattice points are arrayed at regular intervals, however, the lattice point intervals on the output side are very irregular. This results from a shift in values that occurs when conversion from a device-dependent color space into a device-independent color space or inverse conversion is performed. That is, in order to eliminate this shift, in a general color conversion table, the lattice points on the input side are arranged regularly and the lattice points on the output side are arranged so that the lattice point intervals are irregular, and thereby, an optimum color conversion is realized as a result.

However, when correcting a color conversion table, it is desirable to make a correction in a device-independent color space in which a relationship between the lattice point interval and the color difference is linear. In addition, it is possible to evenly make a correction when the lattice point intervals are regular. When there is a shift in the device characteristics, they do not shift uniformly in a color space, and therefore, a shift to be corrected differs from color region to color region. Consequently, if the lattice point intervals are irregular, it is possible to make a correction with high precision in a part dense with lattice points, however, the correction precision in a part where the lattice points are sparse is deteriorated. With respect to the above-described points, the destination profile of the output device to be corrected in Japanese Patent Laid-Open No. 2005-175806 satisfies the condition that the data on the input side where the lattice point intervals are regular is a device-independent color space. As a result, it is possible to obtain the effect of correction by directly correcting the destination profile. However, correcting a color conversion table of a reading device requires to correct a color conversion table where the data on the input side is a device-dependent color space, and therefore, it is necessary to correct data of lattice points having an uneven distribution as represented in FIG. 3B. Consequently, it is necessary to make a certain effort to directly correct the entire color conversion table without unevenness.

There can be conceived a method of indirectly correcting a color conversion table of a reading device. As a method of indirectly correcting a color conversion table, there is a method that uses a color conversion table for correction as disclosed in Japanese Patent Laid-Open No. 2003-324625. In Japanese Patent Laid-Open No. 2003-324625, the destination profile is not corrected directly to make a correction that has taken total amount of tonner into consideration, but a multi-dimensional table is created. The configuration is such that the data read by the reading device is corrected using the created multidimensional table and sent to the destination profile. However, in the method disclosed in Japanese Patent Laid-Open No. 2003-324625, a signal value corresponding to a color to be corrected is selected from the reference table and the device is caused to output a color patch. Consequently, a correction table corresponding only to the intended color is created. This method can be said to be optimum to effectively correct a small number of colors, however, in order to correct the entire color space, more patches are required accordingly. Further, it is also necessary to prepare colorimetric values of those patches, and therefore, the number of patches and amount of time and effort increase in accordance with the number of colors to be corrected.

The present invention has been developed in view of the above-mentioned problems and provides a method of evenly correcting a color conversion table of a reading device in the entire color region even with a limited number of patches.

SUMMARY OF THE INVENTION

The present invention provides an image processing apparatus comprising a component configured to read a document with a reading unit, a component configured to store the read value, a component configured to store a target value of correction used to correct a color conversion table to be applied to the reading component, a component configured to store a correction lookup table used to convert an image signal, converted from a device-dependent color space in accordance with the reading component into a device-independent color space, into the device-independent color space, a component configured to modify a value in the device-independent color space of the correction lookup table in accordance with the stored read value and the stored target value, and a component configured to update the color conversion table using the modified correction lookup table. Here, the document includes at least patches the number of which is smaller than that of lattice points of the correction lookup table and the read value and the target value are obtained in accordance with the patches.

According to the present invention, it is possible to evenly correct a color conversion table of a scanner having data of irregularly arranged lattice points with a limited number of patches in a device-independent color space.

It is also possible to obtain the effect of correction more easily than when directly correcting a scanner color conversion table by using a color conversion table used to convert from a device-independent color space into a device-independent color space separately from the scanner color conversion table.

Further features of the present invention will become apparent from the following description of exemplary embodiments (with reference to the attached drawings).

BRIEF DESCRIPTION OF THE DRAWINGS

FIG. 2A is an example of a color space to be converted using a color conversion table;

FIG. 2B is an example of a color space to be converted using a color conversion table;

DESCRIPTION OF THE EMBODIMENTS

First Embodiment

The present invention is characterized by using a color conversion table used to convert from a device-independent color space into a device-independent color space in correcting a color conversion table in a scanner.

(Configuration of Reader for Simultaneously Reading Double Surfaces)

Figure 1:
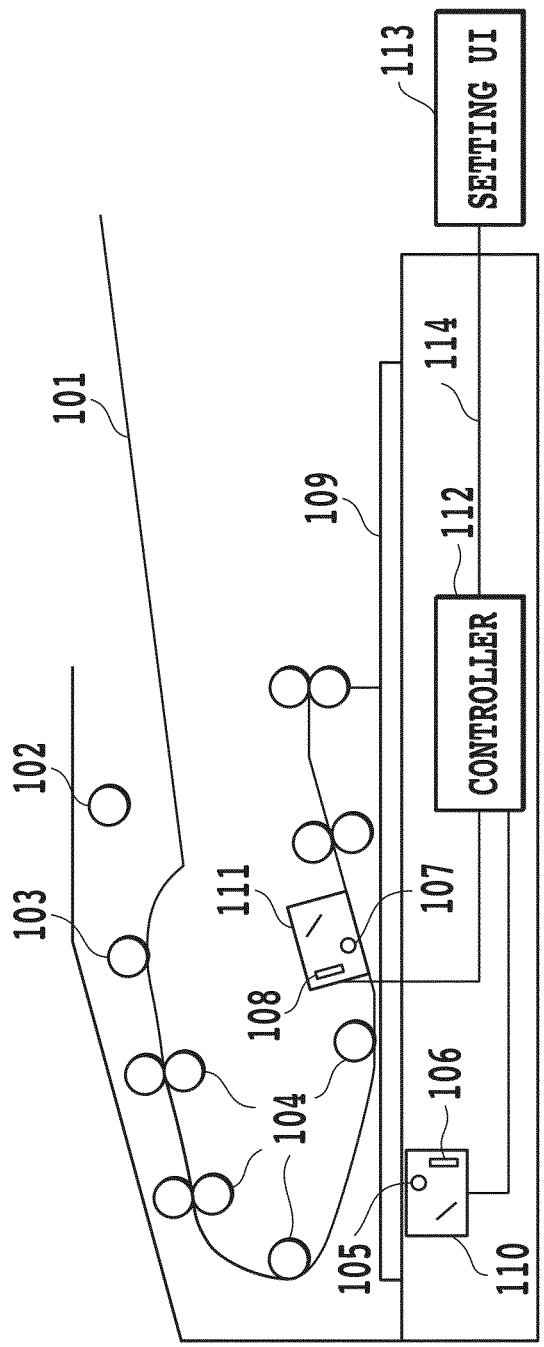
FIG. 1 is diagram of an image processing apparatus in a first embodiment.
Figure 3A:
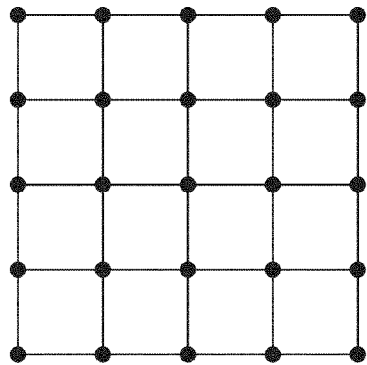
FIG. 3A is a diagram schematically showing an array of lattice point data of a color conversion table.
Figure 3B:
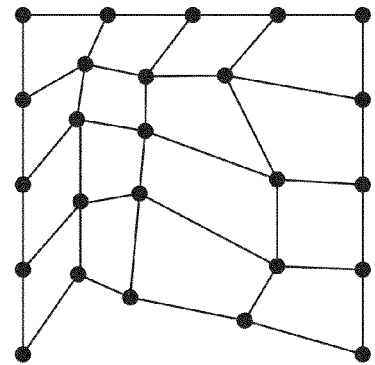
FIG. 3B is a diagram schematically showing an array of lattice point data of a color conversion table.

A reader for simultaneously reading double surfaces, which is an example of an image processing apparatus, is configured, for example, as shown in FIG. 1.

In FIG. 1, reference numeral 101 denotes a platen; 102, a pickup roller; 103, a conveying roller; 104, rollers; 105, 107, light sources; 106, 108, reading parts; and 109, a platen glass. Further, reference numeral 110 denotes a first reading unit and 111 a second reading unit.

Documents stacked on the platen 101 with the obverse surface facing upward are sent to a reading path one by one by the pickup roller 102. The picked-up document is conveyed by the rollers 104 via the conveying roller 103. The reading part 106 is provided with the light source 105. The light source 105 has a spectral intensity in a wavelength region of substantially a visible light region. The document surface having arrived at the read position of the first reading unit 110 is irradiated with light from the light source 105 and the light reflected from the surface of the document enters the reading part 106. Similarly, the opposite surface of the document having arrived at the read position of the second reading unit is irradiated with light from the light source 107 and the light reflected from the surface of the document enters the reading part 108. The reading parts 106, 108 have at least a photoelectric conversion element, by which a number of charges corresponding to the intensity of the incident light is accumulated and the charges are converted into digital data by an A/D converter, not shown schematically, and thus the image information on the document is converted into digital image data. The intensity of light incident to the reading parts 106, 108 depends on the distribution of the spectral reflectivity included in the information on the document.

After the double-surfaces document has been conveyed in this manner and arrived at the read position, the first and second surfaces of the document are read by the first reading unit 110 and the second reading unit 111, respectively. The read data is sent to a controller 112 through a bus 114 and processed or stored appropriately. However, it is not required for a scanner for simultaneously scanning double surfaces to have such a configuration. For example, the paper conveying path and the number of rollers do not necessarily need to be as described above.

Figure 4:
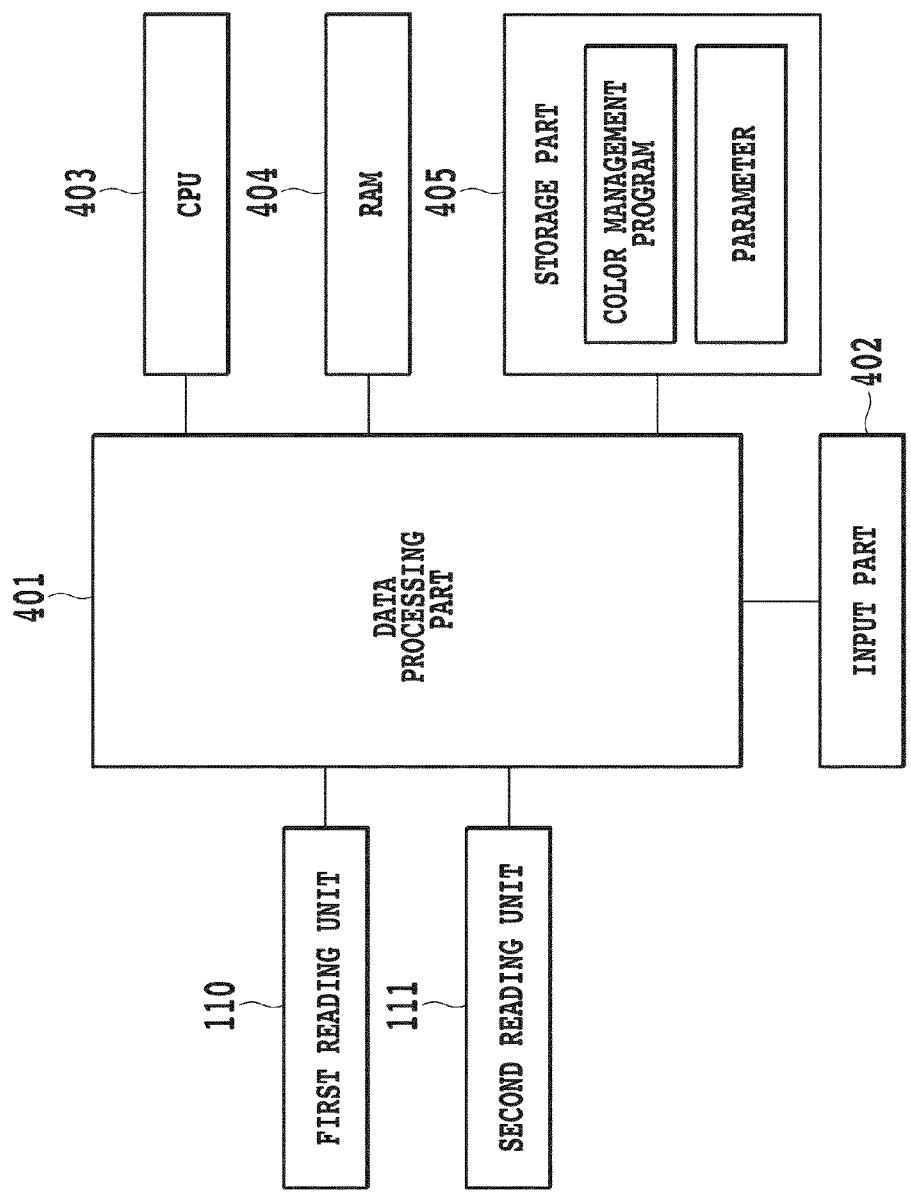
FIG. 4 is a diagram showing a configuration example of an image processing apparatus in an embodiment.

FIG. 4 is a block diagram showing the minimum necessary configuration for a reader for automatically reading double surfaces in FIG. 1. Each image of a document is read by the first reading unit 110 that reads the first surface of the document and by the second reading unit 111 that reads the second surface of the document. The image data that has been taken in is stored temporarily in a RAM 404. The image data in the RAM 404 is stored in a storage part 405 after being subjected to processing in a data processing part 401. A CPU 403 temporarily reads a color management program stored in the storage part 405 into the RAM 404 and executes various kinds of processing by executing the program. It is assumed that chips etc. necessary for image processing, such as the data processing part 401, the CPU 403, and the RAM 404, are mounted on the image processing controller 112.

The storage part 405 includes an HDD, ROM, etc., and not only stores the taken-in image data (image signal) but also stores in advance parameters, color management programs, etc. The parameters also include the first color conversion table and the second color conversion table to be applied to the first reading unit and the second reading unit respectively and these are loaded into the RAM 404 when the device is started and used in image processing in the data processing part 401.

The settings etc. of the parameters from outside are done from an input part 402 and a series of processing relating to the external input is controlled by a controller, not shown schematically, in the data processing part 401.

However, the configuration does not necessarily need to be the one described above and it is possible to add necessary configurations, such as an external I/F configured to connect external equipment or an external line to the main device, and a display part configured to display the state of a device. An example of the image processing apparatus of the present invention includes an MFP (Multi-Function Peripheral), and however a general-purpose computer connected with a plurality of scanner units may be used.

(Outline of Processing)

Figure 5:
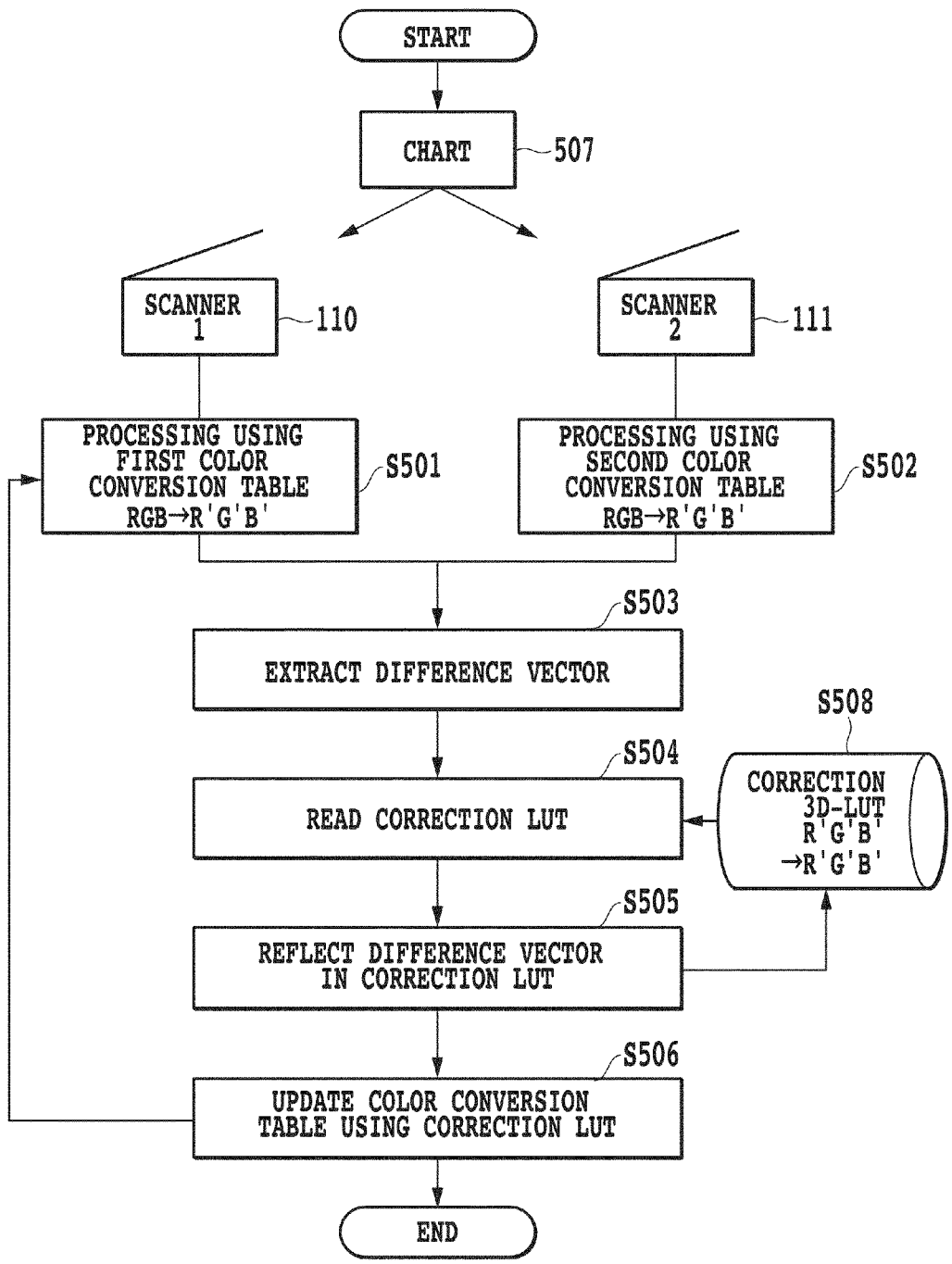
FIG. 5 is a flowchart showing correction processing of a color conversion table in the first embodiment.

Using FIG. 5, correction processing of a color conversion table in the present embodiment will be described.

The program corresponding to the flowchart is included in the color management program stored in the storage part 405 in the read device and loaded in the RAM 404 and executed by the CPU 903.

A correction chart 507, on one side of which patches in a plurality of colors prepared in advance are arranged, is read by the first reading unit 110 and the second reading unit 111.

The correction chart 507 is a reference chart used to calibrate a scanner and evaluate quality. As the correction chart 507, there can be conceived a chart that patch data stored in a storage part of an image output device formed integrally with a reading device is printed. Alternatively, a chart prepared as a correction chart may be used. Details of a correction chart will be described later.

The image data of the correction chart read by the first reading unit 110 is converted into data (first read data) in a device-independent color space using the first color conversion table in step S501 and stored in the RAM 404. Similarly, the image data read by the second reading unit 111 is converted into data (second read data) in a device-independent color space using the second color conversion table in step S502 and stored in the RAM 404.

The values of the same patch read by the two different reading devices are stored as data in the device-independent color space, and therefore, it is possible to calculate a shift between the two reading devices currently used.

Figure 6:
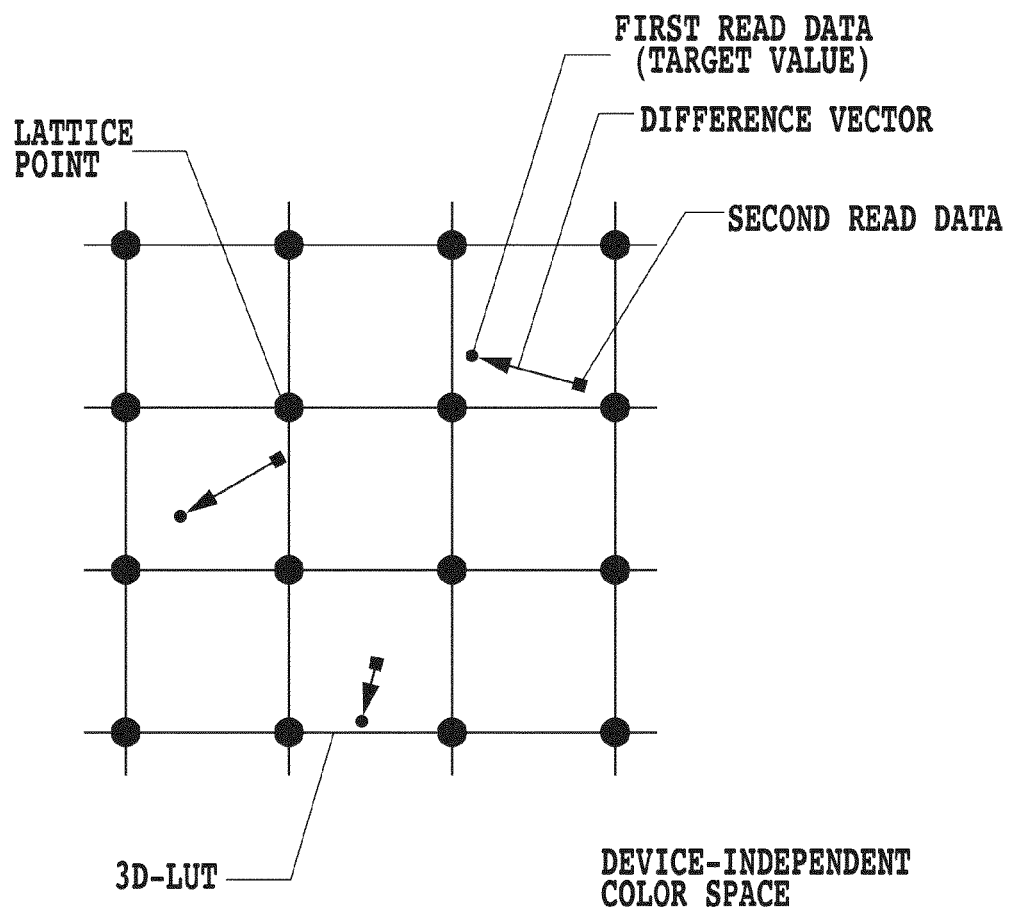
FIG. 6 is a diagram schematically showing the definition of a difference vector in an embodiment.

Here, the difference vector (difference value) corresponding to a shift between colors is defined as follows. FIG. 6 schematically represents a device-independent color space in a two-dimensional manner. Large black circles represent points that divide the color space at regular intervals. Here, FIG. 6 is obtained by mapping the first read data (small black circles) and the second read data (small rectangles) stored in the RAM 409. When it is assumed to take the first read data as a target value for correction in order to correct the color conversion table of the first reading unit 110, a vector obtained by subtracting the second read data from the first read data is taken as a difference vector.

Returning to FIG. 5, the rest of the processing will be described.

In step S503, difference vectors of all of the read patch data are extracted and stored in the RAM 404. A unit to extract patch data from the read image data is realized by the publicly-known patch data extraction algorithm implemented in the color management program.

In step S504, a color conversion table linear from the device-independent color space to the device-independent color space is read, which characterizes the present embodiment. This table is only used to reflect the amount of correction and is mainly characterized by being a device-independent color space in which the lattice point intervals are regular. Hereinafter, this table is referred to as a correction 3D-LUT 508.

The initial correction 3D-LUT 508 is a through conversion table and created so that the values of the input/output are quite the same. That is, all of the lattice points are created by mechanically dividing the device-independent color space. It may also be possible to read the correction 3D-LUT 508 stored in advance in the storage part 405 or to create the correction 3D-LUT 508 at the time of correction using a program and store it in the RAM 404.

In step S505, the difference vector data extracted in step S503 is reflected in the linear correction 3D-LUT 508 and each point of the lattice point data on the input side of the correction 3D-LUT 508 is corrected one by one. A method of correcting a lattice point will be described later.

In step S506, the output data of the color conversion table to be corrected is updated using the correction 3D-LUT 508 in which the amount of correction is reflected. Specifically, for example, a value "b" obtained by inputting a value "a" in the first color conversion table is used as a value on the input side of the correction 3D-LUT 508. Then, the first color conversion table is corrected so that a value "c" obtained by inputting "b" in the correction 3D-LUT 508 is an output value corresponding to the input of "a" of the first color conversion table.

It is possible to evenly correct the entire color space even with a limited number of patches by indirectly correcting with the correction 3D-LUT 508 instead of directly correcting the irregular lattice point data of the color conversion table. The reason that the entire color space can be corrected equally with a limited number of patches is that processing is performed with a search range of a distance of about the interval between the focused lattice point and one lattice point in the present embodiment, as is described later, and therefore, it is possible to correct the entire color space with precision even with a limited number of patches.

(About Correction 3D-LUT)

The linear color conversion table from the device-independent color space to the device-independent color space, which characterizes the present proposal, will be described.

The device-independent color space dealt with by the correction 3D-LUT (correction lookup table) may be any color space as long as it is a device-independent color space. For example, mention is made of the CIE color system, such as an L*a*b* color system, and an arbitrary R'G'B' color system associated with the L*a*b* color system, specified by the International Commission on Illumination (CIE). The 3D-LUT means a lookup table that handles three values.

Figure 11:
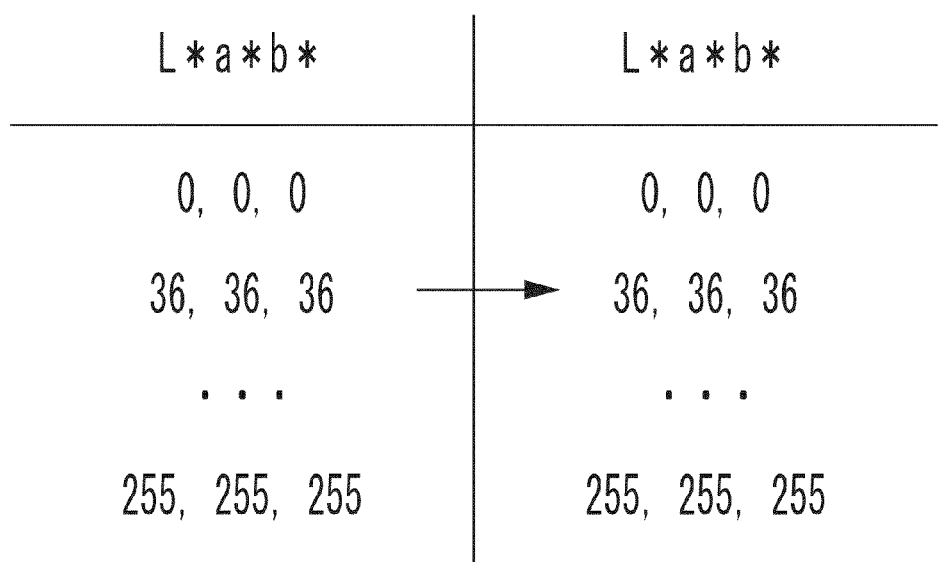
FIG. 11 is an example of an initial state of a correction 3D-LUT.

As for the data of the correction 3D-LUT, the data of the lattice points that divide the device-independent color space at regular intervals is used as the data on the input side and on the output side of the initial correction 3D-LUT. FIG. 11 shows an example of the initial correction 3D-LUT. The initial correction 3D-LUT is a LUT, which performs no conversion. Here, a case is shown, where both the input side and the output side are the same the device-independent color space, however, this is not necessarily required. It may also be possible to create lattice points on the output side corresponding to the lattice points on the input side if the device-independent color spaces are in a relationship in which operations are possible. The correction 3D-LUT created as described above satisfies the condition suitable for the correction when the input side data is the device-independent color space and lattice point intervals are regular.

It can bethought that the number of lattice points is preferable if it is about the same as that of the first (second) color conversion table when the amount of operation, data size, correction precision, etc., are taken into consideration, and when an 8×8×8 lattice color conversion table is corrected, an 8×8×8 lattice correction 3D-LUT is used.

(Lattice Point Correction of Correction 3D-LUT)

A method will be described in detail, which modifies (corrects) the lattice points of the correction 3D-LUT by reflecting the difference vector in the correction 3D-LUT in step S505.

Here, description will be given on assumption that correction is made using the first read data as a target value of correction. The focused lattice point indicates the lattice point data on the input side of the correction 3D-LUT.

Figure 7:
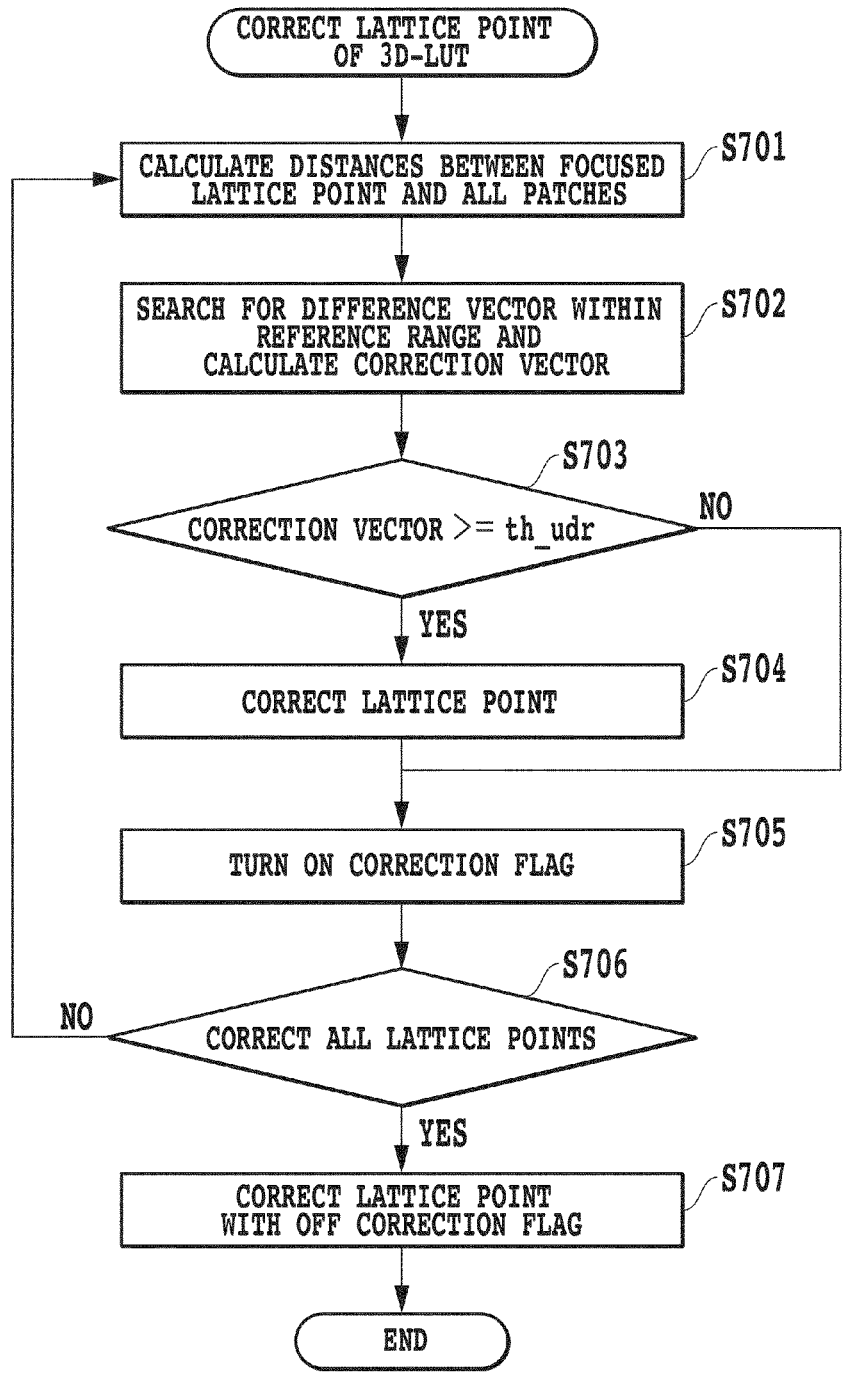
FIG. 7 is a flowchart showing correction processing of a color conversion table in a third embodiment.

FIG. 7 is a flowchart showing lattice point correction processing of the correction 3D-LUT in the present embodiment.

Figure 8:
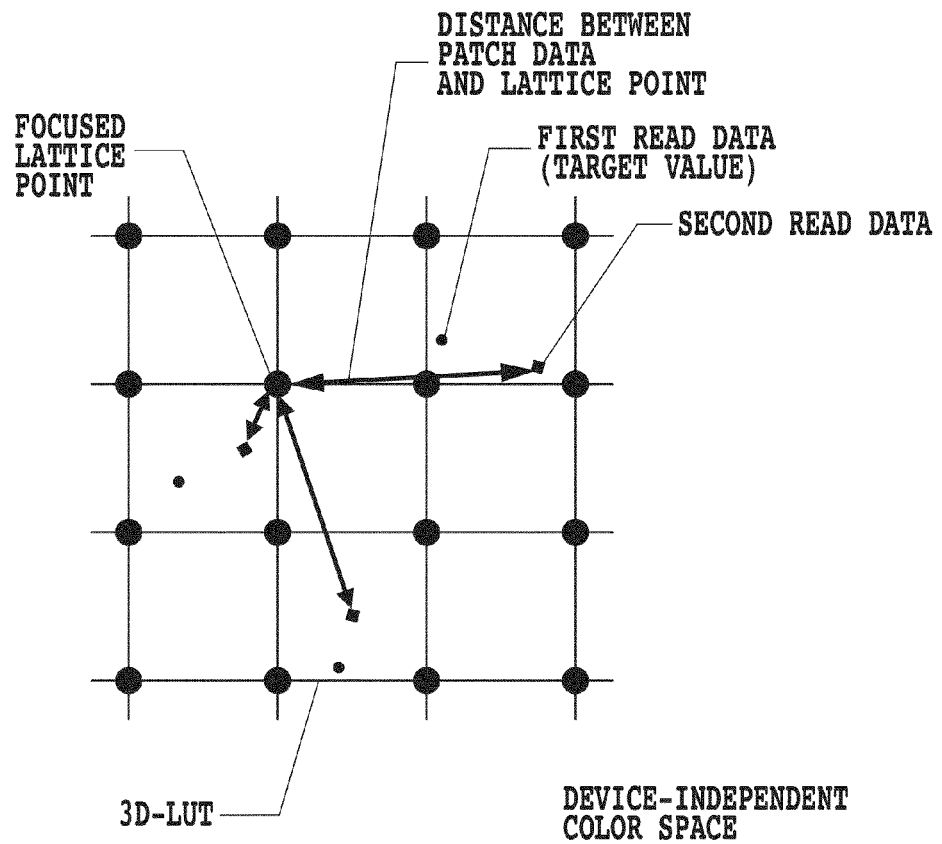
FIG. 8 is a diagram schematically showing the definition of a focused lattice point and patch data in an embodiment.

First, the flow of the processing to correct one lattice point will be described. In step S701, the distances between the focused lattice point and all of the patch data are calculated. Here, the distance between the focused lattice point and the patch data is defined as a distance between the focused lattice point in the device-independent color space and the second read data. FIG. 8 schematically shows the initial correction 3D-LUT and the read data in a two-dimensional manner and the distance represented by the thick two-directional arrow is a distance between the patch data and the focused lattice point. The distance between the focused lattice point and the patch data obtained here is used in a correction vector weight calculation, to be described later. All of the values in FIG. 8 are those in a device-independent space. That is, in the correction 3D-LUT, the values on the input side and on the output side are the values in the device-independent space. The first read data and the second read data are also the values converted using the first color conversion table and the second color conversion table, the values in the device-independent space.

Next, in step S702, a plurality of difference vectors near the focused lattice point is searched for. The search of the difference vector is performed while the reference range (search range) is extended gradually. Here, if only the difference vector closest to the lattice point is referred to, it might be corrected incorrectly. The color space around the lattice point is continuous, and therefore, it is desirable to determine an amount of correction from the multiple difference vectors relatively close to the lattice points, instead of only one difference vector. Then, search is continued until, for example, five difference vectors are found. However, it is assumed that the search range does not exceed a certain threshold value. Even when five difference vectors are not found yet, the search is ended when the search range exceeds the threshold value.

Figure 9:
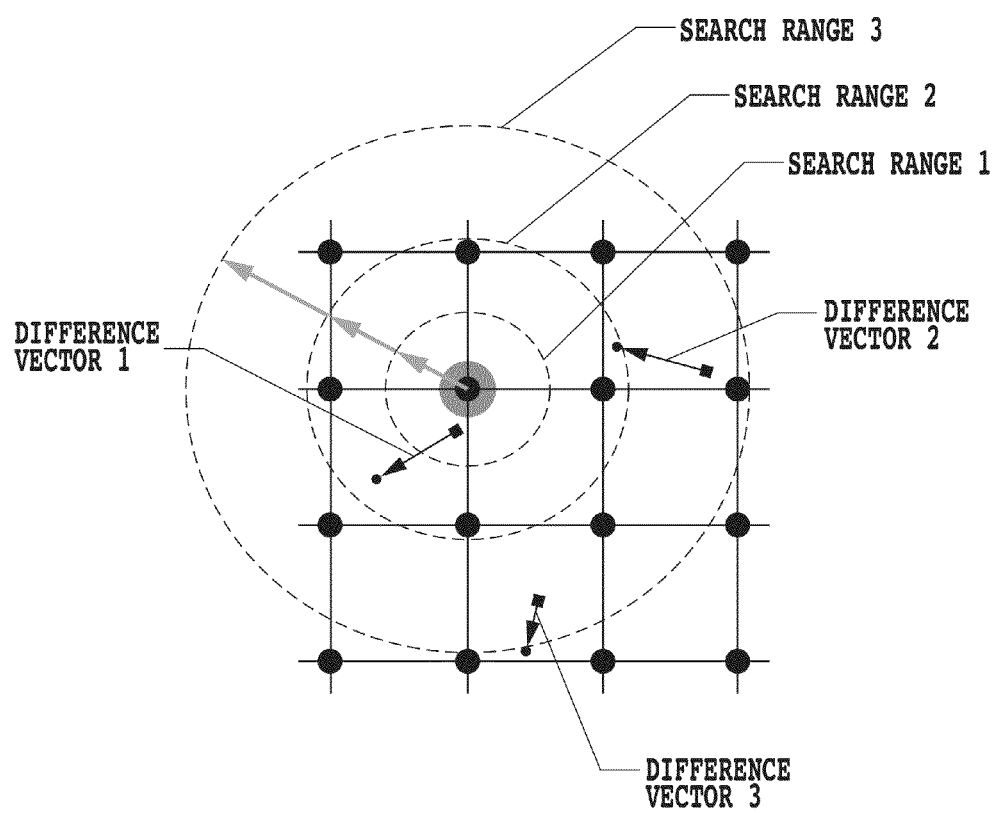
FIG. 9 is a diagram schematically showing a search range of a difference vector in an embodiment.

Further, it is assumed that a difference vector in a search range is detected when the second read data exists in the search range. This is schematically shown in FIG. 9. FIG. 9 schematically shows the initial correction 3D-LUT and the read data in a two-dimensional manner. The search range is extended from 1 to 2 and 3 from the focused lattice point. In a search range 1, a difference vector 1 is detected. When the search range is extended to 2, the second read data to be detected newly does not exist, and therefore, no difference vector is detected. When the search range is extended to 3, difference vectors 2 and 3 are detected.

However, the condition of detection of difference vector may not be the one described above, and the condition of detection may be that when part of a difference vector exists in the search range, the difference vector is determined to be detected.

After detection of a difference vector is completed in step S702, a correction vector is calculated from no less than one and no more than five difference vectors detected. The correction vector is used to correct the correction 3D-LUT. When no difference vector is detected, nothing is done because correction processing is performed later in step S707.

First, the magnitude of the detected difference vector is confirmed. When the difference vector is too large, it is obvious that there is a possibility that either read device outputs an abnormal value. Such a difference vector is different from a value to be corrected really and conversely causes deterioration of a shift in color. Consequently, th_ovr is set in advance as an upper limit value (first threshold value) of the magnitude of a difference vector and when the th_ovr is exceeded as a result of a comparison between a difference vector and the first threshold value th_ovr, the value of the difference vector is adjusted to zero. It may also be possible to design so that the th_ovr can be adjusted in several steps. If a large threshold value is set, the risk that an erroneous correction is performed is increased, however, a correction that is most likely to exhibit the effect of correction is performed.

The correction vector is calculated by weighting the detected difference vector based on the distance between the lattice point calculated in step S701 and the patch. The closer a color difference vector to the lattice point, the heavier the weight is set and the more distant a color difference vector is, the lighter its weight is set. For example, a Euclid distance in a device-independent color space is used as a distance and a weight is calculated using the following formula.

$$W=1/(dist^5+1)$$

where W represents a weight and dist represents the distance from the lattice point normalized by half the lattice point interval.

A correction vector for one lattice point is calculated as described above. However, the entire color space is corrected with a limited number of patches, and therefore, there are some parts where a shift in color may be increased locally. Specifically, there is a possibility that the color lattice points arranged almost regularly before correction may be arranged irregularly after correction due to the shift in color therearound. Such lattice points are lattice points that do not originally require correction, and therefore, a correction vector will be very small. Consequently, it is possible to prevent an unintended shift in color by not correcting a lattice point when its correction vector is very small. In step S703, the lower limit value (second threshold value) th_udr of the correction vector is compared with the magnitude of the calculated correction vector. When the correction vector is not smaller than the threshold value th_udr, the lattice point is corrected in step S704 and a flag indicating that correction is completed is set in step S705 (a bit flag is stored in a predetermined region in the RAM 404). When the correction vector is smaller than the threshold value th_udr, the correction vector is adjusted. Specifically, a flag indicating completion of correction is set in step S705 without correcting the lattice point. It may also be possible to set th_udr so that it can be adjusted in several steps.

In step S706, whether the processing of all of the lattice points is completed is determined.

If there is a lattice point not having been processed yet, the procedure is returned to step S701 and the above-mentioned processing is repeated.

Finally, the lattice point having the OFF correction flag is corrected. Such a lattice point is a lattice point that has failed to find patch data therearound and mainly located at the end of the correction 3D-LUT. Consequently, it is continuous with a shift in a nearby color space, and therefore, the amounts of correction of lattice points therearound are averaged and the average is regarded as a correction vector. The number of lattice points therearound is smallest, that is 7, when the lattice point is located at the corner of the 3D-LUT, 11 when the lattice point is located on the side of the 3D-LUT, and when the lattice point is located on the outermost circumferential plane of the 3D-LUT, the lattice point is surrounded by the 17 lattice points.

the manner described above, the correction of all of the lattice points on the input side of the correction 3D-LUT is completed. Then, as described above, the correction of the color conversion table to be corrected is performed using the correction 3D-LUT for which the correction of the lattice points on the input side is completed.

(About Correction Chart)

Here, the patch of a correction chart will be described.

As the number of patches increases, the correction precision becomes higher, however, the overall processing speed is reduced because of an increase in the amount of operation. As the number of patches decreases, the burden of processing is alleviated, however, the correction precision is reduced, and therefore, an appropriate effect cannot be obtained when the number of patches is too large or too small.

It is desirable for each color of the patch data to be appropriately distant from each other in a device-independent color space to be corrected. Further, it is also desirable for the patch data to be evenly distributed in the entire device-independent color space to be corrected. It is needless to say that a strict evenness is not required.

The number of patches is appropriate when a plurality of pieces of patch data can be found in a search range from any lattice point although some degree of denseness or sparseness is acceptable in search for patch data in a predetermined range from a lattice point. It is possible to obtain the effect of correction by setting a distance, about the interval from the focused lattice point and a lattice point, to a search range, and therefore, it is made possible to perform processing with a considerably smaller number of patches compared to that required in the method of newly creating all the lattice points in the color conversion table.

According to the method described above, it is possible to evenly correct the color processing table of a scanner having data of lattice points arranged irregularly in a device-independent color space with a limited number of patches.

It is possible to obtain the effect of correction more easily than when directly correcting a scanner color conversion table by using a color conversion table from a device-independent color space into a device-independent color space separately from the scanner color conversion table when performing correction.

Second Embodiment

Here, only the correction of lattice points of the correction 3D-LUT will be described when the correction is different from that in the first embodiment.

In the first embodiment, the correction 3D-LUT in which the difference vector is reflected is created by moving the data of the lattice point on the input side of the correction 3D-LUT. However, when both the input side and the output side are the same device-independent color space, it is possible to obtain the same effect even by correcting the lattice point data on the output side of the correction 3D-LUT. However, it is required that the intervals of the lattice points on the output side of the correction 3D-LUT be regular in the initial state and that the device-independent color space be the same as that of the difference vector.

Further, when the device-independent color spaces are different between the input side and the output side of the correction 3D-LUT and the lattice point data on the output side is to be corrected, it is only required to regularly divide the lattice point interval on the output side and to create lattice points on the input side, corresponding thereto.

As described above, it is possible to simultaneously perform color space conversion in the device-independent color space at the same time as reflecting the amount of correction using the correction 3D-LUT.

Third Embodiment

Here, only the patch data will be described when it is different from that in the first embodiment.

In the first embodiment, the patch data is created without distinguishing monochrome from multicolor, however, when the reading units 110, 111 have an adjusting function, there is a possibility that a situation in which correction of a specific color is not necessary.

In general, a reading device performs correction based on the white standard in the device. The gray axis from white to black is supposed to be already in the optimally corrected state and it can be said that the patch data does not require data of only K.

Consequently, it is possible to reduce the number of patches by omitting data of only K when creating a correction chart. Because gray is corrected on the device side, it is possible to obtain the effect of correction without any problem by correcting only chromatic colors. In this manner, it is possible to create a correction chart using a color patch that uses at least two colors of a plurality of color materials.

This also applies to monochrome, such as C, M and Y. When there is a correcting function of monochrome on the device side, it is possible to obtain the effect of correction after reducing the number of patches by creating the chart using a color including secondary or more colors.

Fourth Embodiment

The present embodiment is characterized by using a color conversion table used to convert from a device-independent color space into a device-independent color space in calibration in order to match the reading characteristics of a scanner with a document.

However, detailed description of a configuration substantially the same as that of the first embodiment is omitted.

Figure 13:
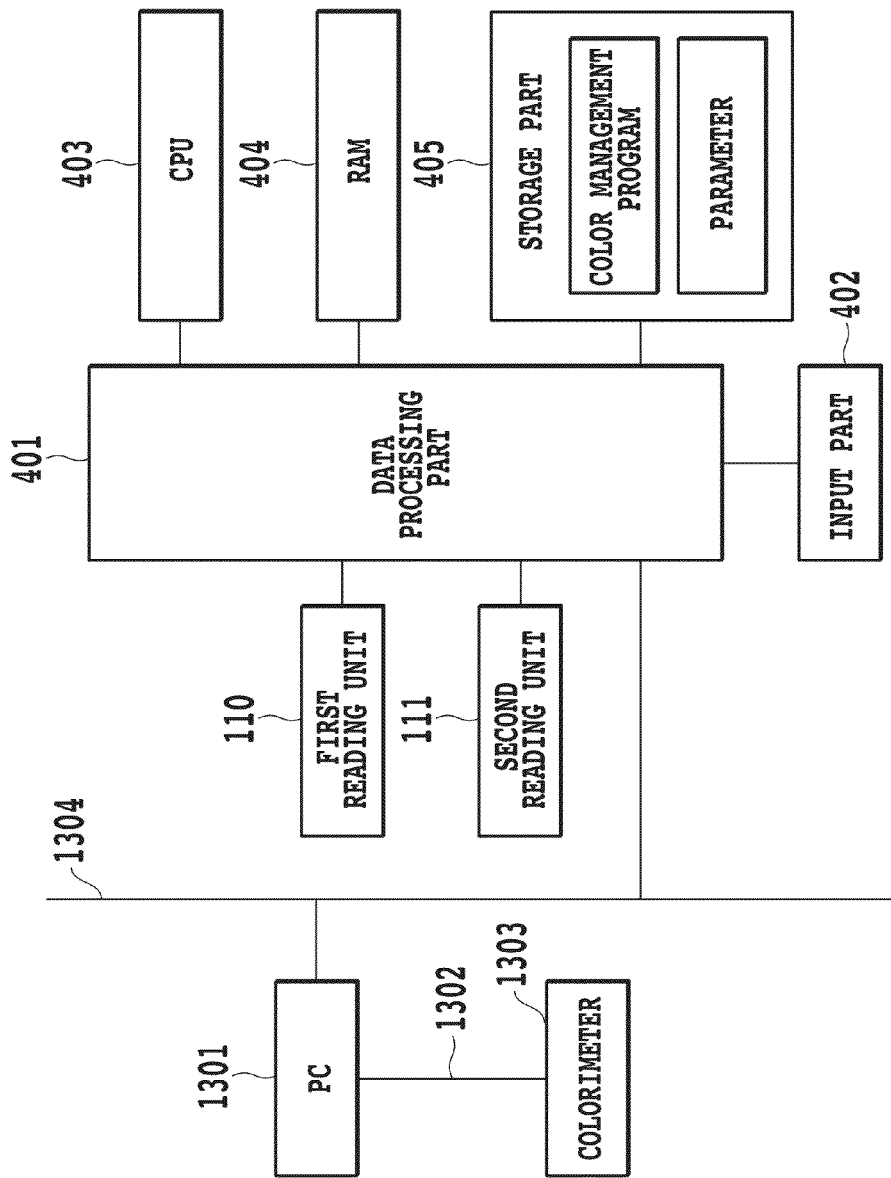
FIG. 13 is a diagram showing a configuration example of an image processing system in the fourth embodiment.

FIG. 13 shows a configuration example of a system in a fourth embodiment. Description of the same parts as those in the first embodiment is omitted. The present embodiment comprises a colorimeter 1303 necessary for color measurement and a PC 1301 to store the colorimetric data in addition to the reading device. The PC 1301 is connected with the colorimeter 1303 via, for example, a USB cable 1302, and the colorimetric value obtained by the colorimeter 1303 is uploaded to the reading device via a LAN 1304.

Figure 12:
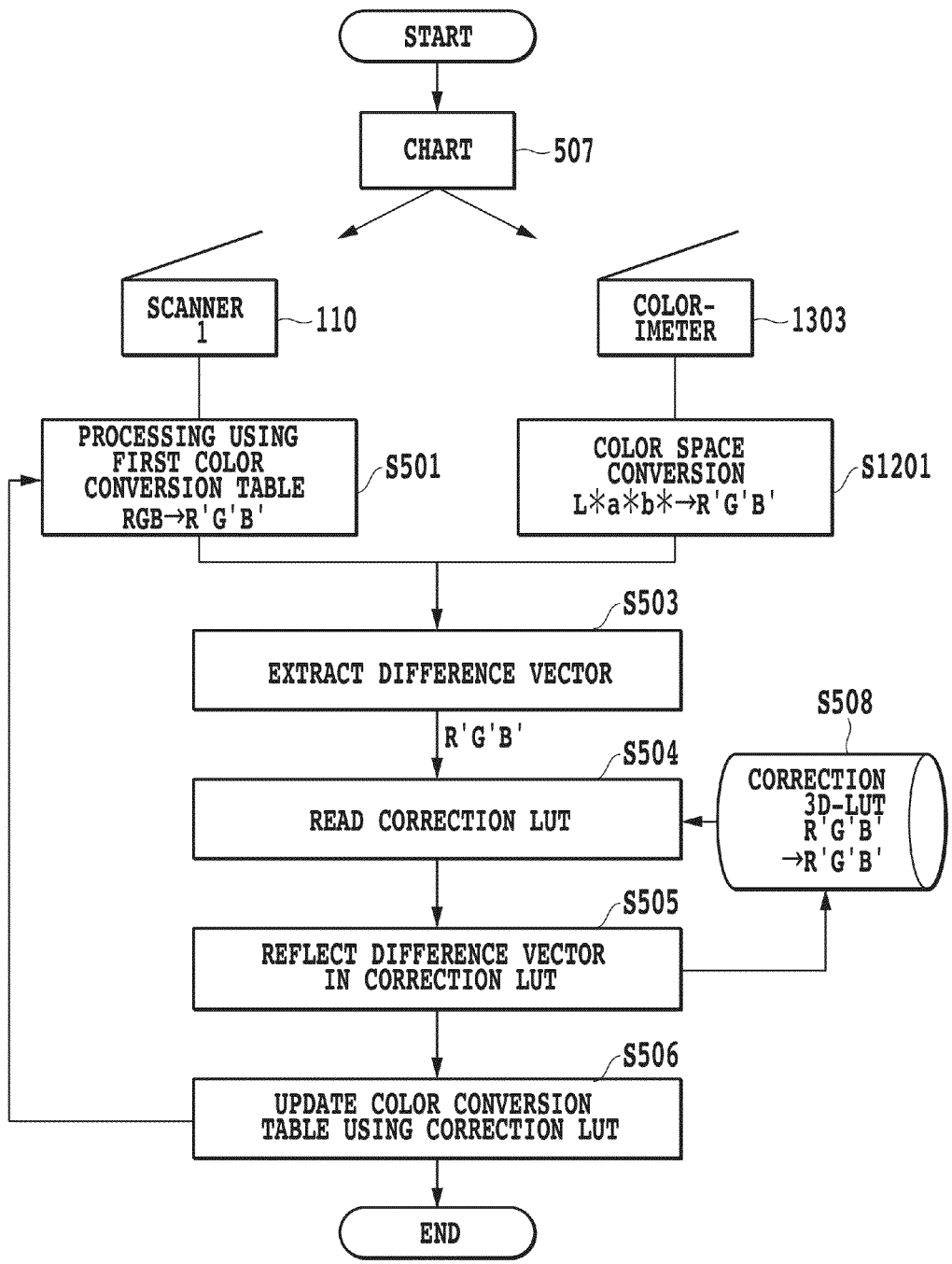
FIG. 12 is a flowchart showing correction processing of a color conversion table in a fourth embodiment.

The correction processing of a color conversion table in the present embodiment will be described using FIG. 12.

A program corresponding to the flowchart is included in the color management program stored in the storage part 405 within the reading device and loaded in the RAM 404 and executed by the CPU 403.

The correction chart 507, on one surface of which patches in a plurality of colors prepared in advance are arranged, is read by the first reading unit 110. At the same time, the colors of the same correction chart 507 are measured by the colorimeter 1303 and the colorimetric values are stored temporarily in the PC 1301. When the calorimetric values are different from a color space of the correction 3D-LUT 508, the data of the colorimetric values is converted into a color space on the input side of the correction 3D-LUT 508 in step S1201 using an operation program within the PC 1301, not shown schematically. The data of the colorimetric values or the data converted after the color measurement is sent to the reading device via the LAN 1304, and after stored in the RAM 404, it is used in processing in step S503 and subsequent steps. After that, the same processing as that in the first embodiment is performed.

For the second reading unit 111, it is possible to correct the color conversion table in accordance with the color of a document by performing the same processing as that described above.

Fifth Embodiment

A case will be described, where settings of various parameters are done and instructions of execution procedure are issued from a user interface (UI) in order to realize the first embodiment will be described.

However, the description of the correction processing itself is omitted because it is the same as that in the first embodiment.

Figure 10A:
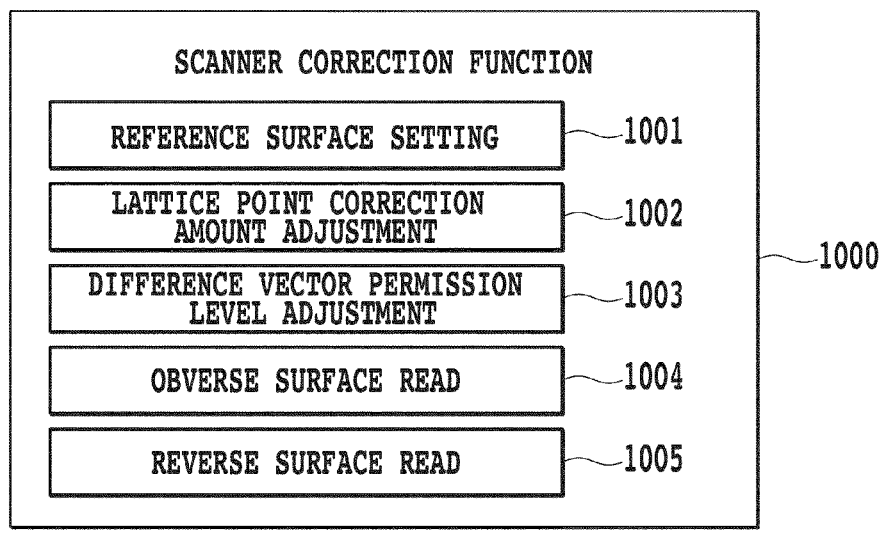
FIG. 10A is a diagram of a UI example in a fifth embodiment.

FIG. 10A shows an example of a UI screen 1000. The screen includes a mode of reference surface setting 1001 for setting a target value of correction, a mode of lattice point correction amount adjustment 1002 for adjusting the th_udr level, and a mode of difference vector permission level adjustment 1003 for adjusting the th_ovr level. Further, the screen also includes a mode of obverse surface read 1004 for reading a correction chart with the first reading device and a mode of reverse surface read 1005 for reading a correction chart with the second reading device.

The read of the correction chart 507 is executed by a user selecting the obverse surface read 1004 and the reverse surface read 1005 to execute document read. When an unintended situation occurs, the read processing is stopped and an error display is produced on the UI.

It may also be possible to transfer to another setting screen by a user selecting the reference surface setting 1001, the lattice point correction amount adjustment 1002, or the difference vector permission level adjustment 1003, or to provide a box into which a setting value can be input on the UI screen 1000.

Figure 10B:
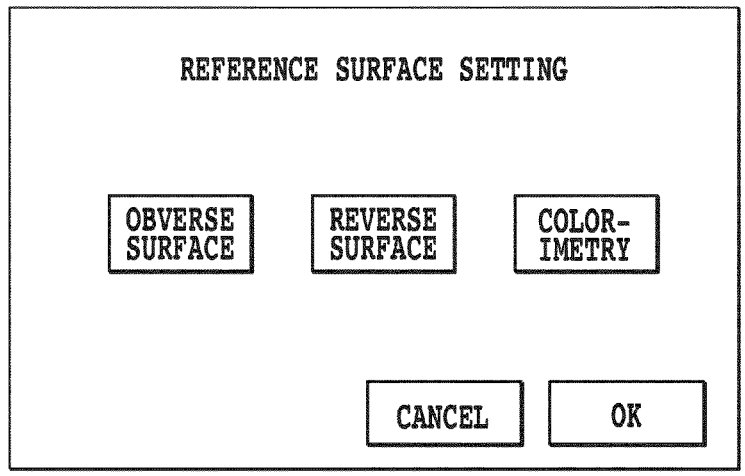
FIG. 10B is a diagram of a UI example in the fifth embodiment.

FIG. 10B shows an example of a setting screen of the reference surface setting 1001. When "Obverse surface" is selected in the reference surface setting 1001, a color conversion table corresponding to the reverse surface is corrected using the obverse surface as a target value in the relative correction of both the obverse surface and the reverse surface. When "Reverse surface" is selected, a color conversion table corresponding to the obverse surface is corrected using the reverse surface as a target value in the relative correction of both the obverse surface and the reverse surface. When "Colorimetry" is selected, a color conversion table corresponding both to the obverse surface and to the reverse surface is corrected using a colorimetric value as a target value in the absolute correction with respect to a document.

Figure 10C:
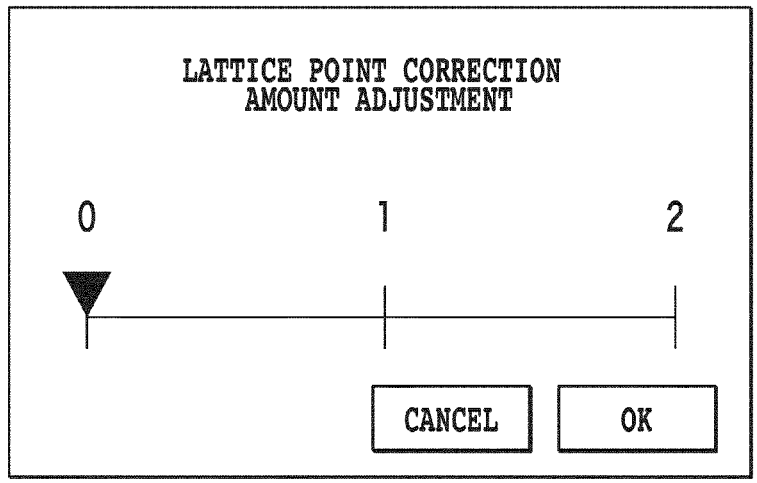
FIG. 10C is a diagram of a UI example in the fifth embodiment.

FIG. 10C shows an example of a setting screen of the lattice point correction amount adjustment 1002. In the case of zero, no threshold value is set, and as the setting level is increased to one and two, the value of th_udr increases. It may also be possible to design the screen so that a threshold value can be input directly rather than a level is adjusted.

Figure 10D:
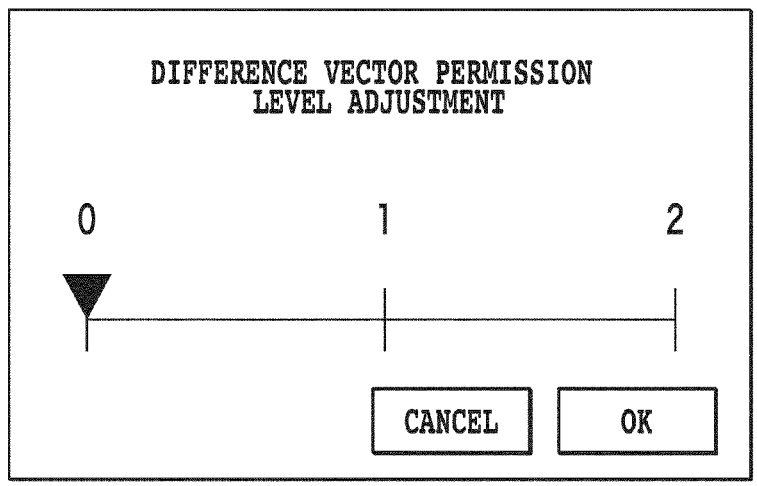
FIG. 10D is a diagram of a UI example in the fifth embodiment.

FIG. 10D shows an example of a setting screen of the difference vector permission level adjustment 1003. In the case of zero, no threshold value is set and as the setting level is increased to one and two, the value of th_ovr decreases. It may also be possible to design the screen so that a threshold value can be input directly rather than a level is adjusted.

It may also be possible to arrange a cancel button and an OK button in each setting screen so that the setting of various parameters or processing is executed when the OK button is pressed.

It is also possible to set an initial value for the parameter when each level is adjusted. In this case, it may also be possible to design so that each parameter is reset to the initial value when an inappropriate value is detected in the correction processing of the correction lookup table.

Sixth Embodiment

Here, an example of a method of creating the correction chart in the first embodiment will be described.

In general, an output device has a color conversion table from a device-independent color space to a device-dependent color space. Consequently, it is possible to create a chart of data appropriately evenly distributed in the entire color space in the device-independent color space by using the lattice point data of the color conversion table from which the lattice point data is thinned at regular intervals as patch data. In particular, this is very effective when the device-independent color space of the color conversion table is the same as the device-independent color space of the correction 3D-LUT.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-034174, filed Feb. 17, 2009, which is hereby incorporated by reference herein in its entirety.

What is claimed is:

1. An image processing apparatus comprising:
a component configured to read a document with a reading unit;
a component configured to store a read value;
a component configured to convert the read value in a device-dependent color space into a value in a device-independent color space using a color conversion table;
a component configured to store a target value of correction used to correct the color conversion table;
a component configured to store a correction lookup table used to input a value in the device-independent color space converted from a value in the device-dependent color space by the color conversion table and to convert the input value into an output value in the device-independent color space, wherein the correction lookup table is different from the color conversion table;
a component configured to modify a value in the device-independent color space of the correction lookup table using a difference value between the stored read value and the stored target value, wherein the correction lookup table is a lookup table used to convert an input value in the device-independent color space into an output value in the device-independent color space; and
a component configured to update the color conversion table using the modified correction lookup table, wherein the correction lookup table is a lookup table used to convert an input value in the device-independent color space into an output value in the device-independent color space, wherein
the document comprises patches, the number of the patches is smaller than the number of lattice points of the correction lookup table, and wherein the read value and the target value are obtained by reading the patches by the reading unit and wherein the correction lookup table is a lookup table used to convert an input value in the device-independent color space into an output value in the device-independent color space.

2. The image processing apparatus according to claim 1, wherein the target value of correction is obtained by reading the document with another reading unit.

3. The image processing apparatus according to claim 1, wherein the target value of correction is obtained by measuring the color of a document with a colorimeter.

4. The image processing apparatus according to claim 1, wherein
the modifying component includes a component configured to adjust the difference value when the difference value is greater than a first threshold value as a result of a comparison between the difference value and the first threshold value.

5. The image processing apparatus according to claim 1, wherein the modifying component further includes a component configured to calculate an amount of correction by weighting a difference value in accordance with a distance from the lattice point of the correction lookup table to the difference value.

6. The image processing apparatus according to claim 1, wherein the modifying component further includes a component configured to search for a difference value within a fixed range from a lattice point.

7. The image processing apparatus according to claim 1, wherein the modifying component further includes a component configured to search for a difference value while extending a reference range.

8. The image processing apparatus according to claim 5, wherein the modifying component includes a component configured to adjust the amount of correction when the amount of correction is smaller than a second threshold value as a result of a comparison between the calculated amount of correction and the second threshold value.

9. The image processing apparatus according to claim 1, wherein the document including the patches has data in which the patches are distributed evenly in the entire color space within the color space to be corrected.

10. The image processing apparatus according to claim 1, wherein the document has a color patch that uses at least two colors among a plurality of color materials and the read value in accordance with the color patch is distributed evenly in the device-independent color space.

11. The image processing apparatus according to claim 1, further comprising a component configured to select the target value.

12. The image processing apparatus according to claim 1, further comprising a component configured to adjust various parameters at the time of the modification by the modifying component.

13. The image processing apparatus according to claim 1, further comprising a component configured to reset parameters to initial values when the modification by the modifying component is not appropriate.

14. An image processing method in an image processing apparatus including a component configured to read a document with a reading unit, a component configured to store a read value, a component configured to convert the read value in a device-dependent color space into a value in a device-independent color space using a color conversion table, and a component configured to store a target value of correction used to correct the color conversion table, the method comprising the steps of:
storing a correction lookup table used to input a value in the device-independent color space converted from a value in the device-dependent color space by the color conversion table and to convert the input value into an output value in the device-independent color space, wherein the correction lookup table is different from the color conversion table;

modifying a value in the device-independent color space of the correction lookup table using a difference value between the stored read value and the stored target value, wherein the correction lookup table is a lookup table used to convert an input value in the device-independent color space into an output value in the device-independent color space; and updating the color conversion table using the modified correction lookup table, wherein the correction lookup table is a lookup table used to convert an input value in the device-independent color space into an output value in the device-independent color space, wherein the document comprises patches, the number of the patches is smaller than the number of lattice points of the correction lookup table, and wherein the read value and the target value are obtained by reading the patches by the reading unit and wherein the correction lookup table is a lookup table used to convert an input value in the device-independent color space into an output value in the device-independent color space.

15. A non-transitory computer readable recording medium having a program that causes a computer to execute an image processing method in an image processing apparatus including a component configured to read a document with a reading unit, a component configured to store a read value, a component configured to convert the read value in a device-dependent color space into a value in a device-independent color space using a color conversion table, and a component configured to store a target value of correction used to correct the color conversion table, conversion of the read value from device dependent color space into device independent color space, the image processing method comprising the steps of:

storing a correction lookup table used to input a value in the device-independent color space converted from a value in the device-dependent color space by the color conversion table and to convert the input value into an output value in the device-independent color space, wherein the correction lookup table is different from the color conversion table;

modifying a value in the device-independent color space of the correction lookup table using a difference value between the stored read value and the stored target value, wherein the correction lookup table is a lookup table used to convert an input value in the device-independent color space into an output value in the device-independent color space; and updating the color conversion table using the modified correction lookup table, wherein the correction lookup table is a lookup table used to convert an input value in the device-independent color space into an output value in the device-independent color space, wherein the document comprises patches, the number of the patches is smaller than the number of lattice points of the correction lookup table, and wherein the read value and the target value are obtained by reading the patches by the reading unit and wherein the correction lookup table is a lookup table used to convert an input value in the device-independent color space into an output value in the device-independent color space.

\* \* \* \* \*